United States Patent
Rosner et al.

(10) Patent No.: US 6,856,490 B2
(45) Date of Patent: Feb. 15, 2005

(54) FLEX CABLE ASSEMBLY WITH IMPROVED FLEX CABLE DYNAMIC LOOP CHARACTERISTICS

(75) Inventors: Wolfgang Rosner, Burnsville, MN (US); Andrew R. Motzko, Savage, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 168 days.

(21) Appl. No.: 10/180,427

(22) Filed: Jun. 25, 2002

(65) Prior Publication Data

US 2003/0147180 A1 Aug. 7, 2003

Related U.S. Application Data

(60) Provisional application No. 60/355,704, filed on Feb. 7, 2002.

(51) Int. Cl.[7] .......................... G11B 5/55; G11B 33/12; H05K 7/02
(52) U.S. Cl. ............................... 360/264.2; 360/97.01; 361/685; 361/749
(58) Field of Search .......................... 360/264.2, 266.3, 360/97.01, 98.01; 361/685, 749

(56) References Cited

U.S. PATENT DOCUMENTS

| | | | |
|---|---|---|---|
| 5,109,310 A | * | 4/1992 | Ohkjita et al. ............ 360/97.01 |
| 5,130,895 A | * | 7/1992 | Somemiya et al. ....... 360/264.2 |
| 5,375,021 A | * | 12/1994 | Boeckner ................. 360/264.2 |
| 5,508,860 A | | 4/1996 | Takagi et al. |
| 5,543,982 A | | 8/1996 | Takagi et al. |
| 5,584,451 A | | 12/1996 | Bonn et al. |
| 5,680,277 A | | 10/1997 | Bonn et al. |
| 5,717,541 A | | 2/1998 | Ycas et al. |
| 5,909,338 A | | 6/1999 | Butler et al. |
| 5,953,183 A | * | 9/1999 | Butler et al. ............. 360/264.2 |
| 6,021,025 A | * | 2/2000 | Komura et al. .......... 360/266.3 |
| 6,168,459 B1 | | 1/2001 | Cox et al. |
| 6,236,553 B1 | | 5/2001 | Widell |
| 6,556,386 B1 | * | 4/2003 | Endo ....................... 360/264.2 |

FOREIGN PATENT DOCUMENTS

WO        WO 9966499 A1  * 12/1999    ............ G11B/5/48

* cited by examiner

Primary Examiner—Craig A. Renner
(74) Attorney, Agent, or Firm—Fellers, Snider, et al.

(57) ABSTRACT

A flex cable assembly for use in a disc drive data storage device includes a laminated flex cable and a flex cable support. The flex cable provides electrical communication paths between a moveable head stack assembly and a disc drive printed circuit board. The flex cable support comprises a base and adjacent first and second flex support portions with respective first and second flex support surfaces. The flex cable is routed along the flex support surfaces and exerts a spring force thereagainst as the flex cable attempts to return to a nominally planar orientation. The direction of the second flex support surface establishes the orientation of a dynamic loop between the flex cable support and the head stack assembly. Preferably, a portion of the flex cable pulls away from the second flex support surface to lengthen the dynamic loop in response to movement of the head stack assembly.

17 Claims, 3 Drawing Sheets

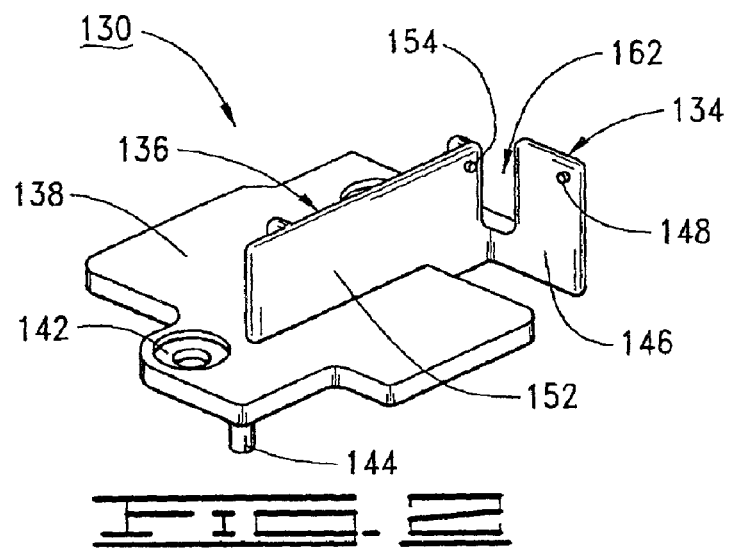
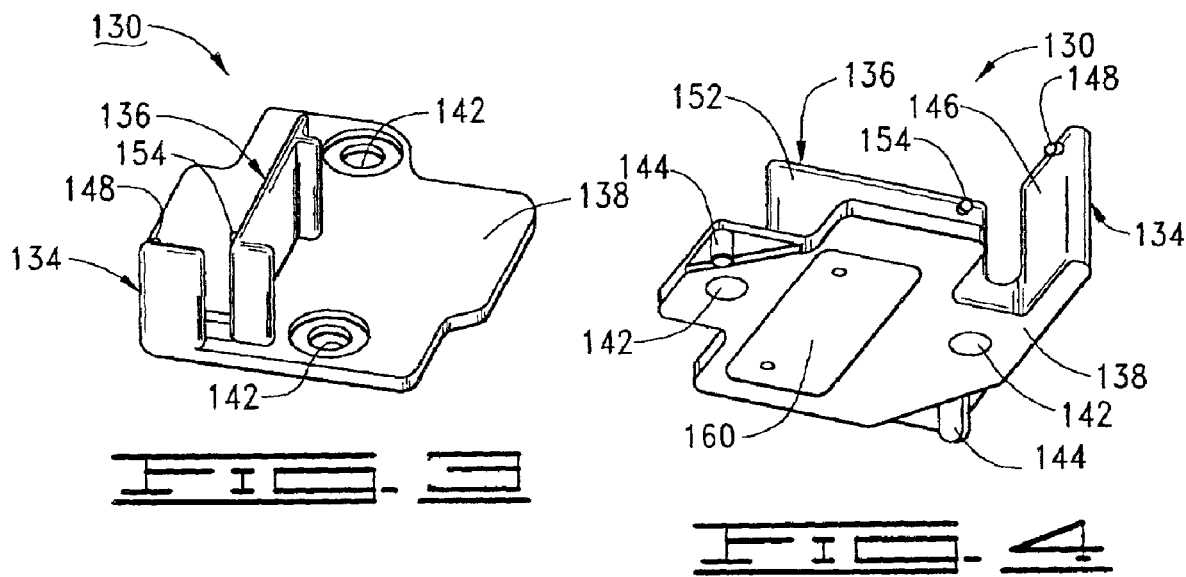
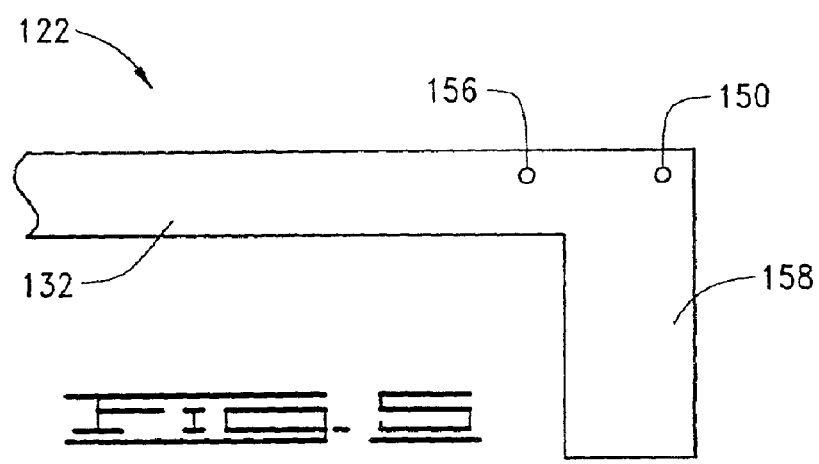

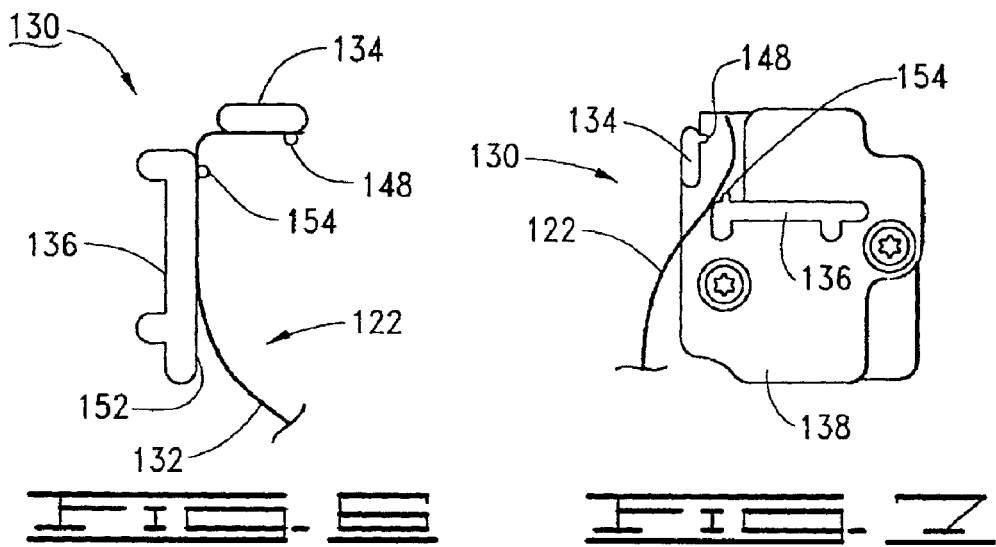
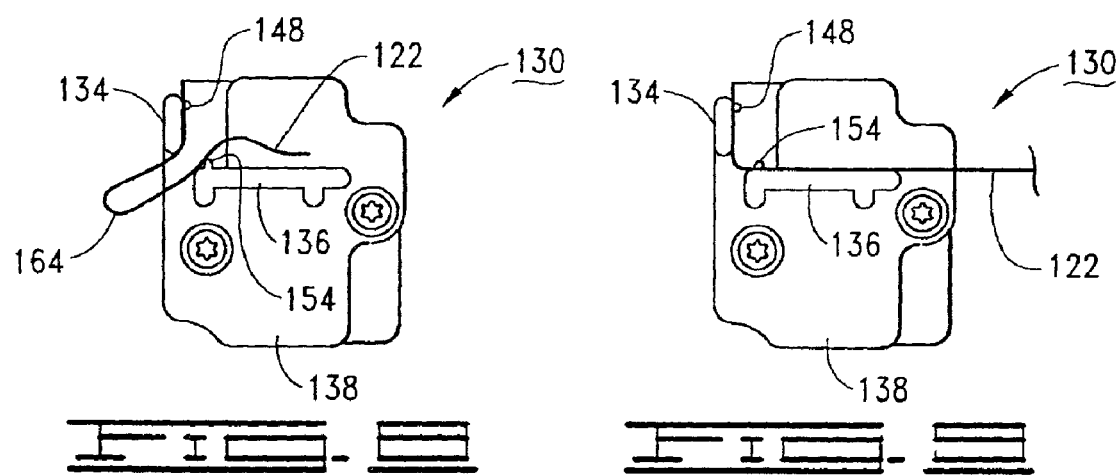
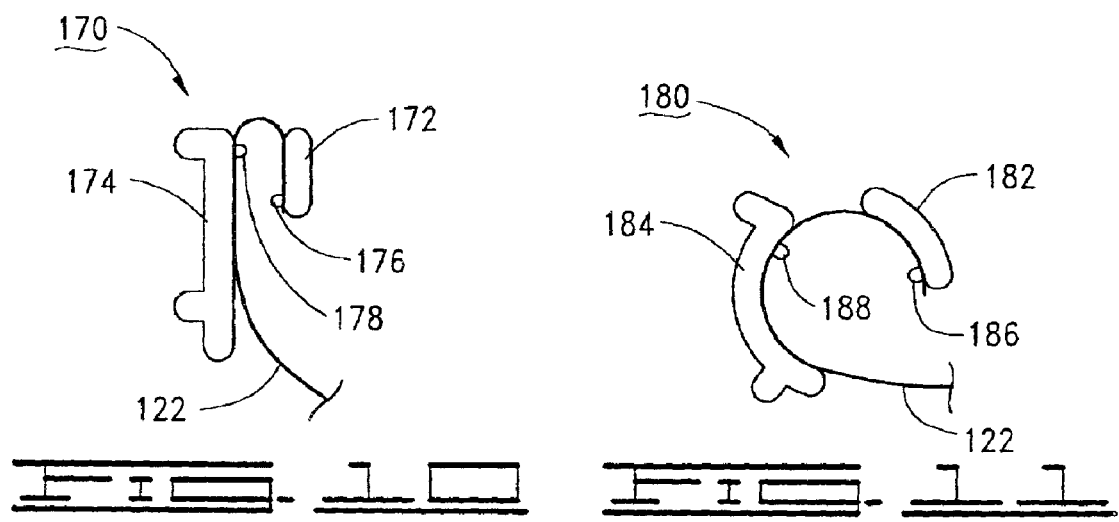

FLEX CABLE ASSEMBLY WITH IMPROVED FLEX CABLE DYNAMIC LOOP CHARACTERISTICS

RELATED APPLICATIONS

This application claims the benefit of U.S. Provisional Application No. 60/355,704 entitled FLEX CLAMP filed Feb. 7, 2002.

FIELD OF THE INVENTION

The claimed invention relates generally to disc drive data storage devices and more particularly, but not by way of limitation, to an improved flex cable assembly in a disc drive which provides improved flex cable dynamic loop characteristics.

BACKGROUND

Disc drive data storage devices store and retrieve large amounts of computerized data in a fast and efficient manner. A typical disc drive includes one or more rigid data storage discs which are rotated by a spindle motor at a constant high speed.

Data are stored to and retrieved from tracks defined on the disc surfaces by a rotary actuator assembly (head stack assembly, HSA). The HSA supports a corresponding number of data transducing heads which are controllably moved across the disc surfaces by an actuator motor (voice coil motor, VCM).

The spindle motor and the HSA are typically mounted to a rigid base deck which cooperates with a top cover to provide a protected interior environment for the discs and heads. A flex cable assembly is used to provide the requisite electrical communication paths between the HSA and a disc drive printed circuit board (PCB) mounted to the exterior of the base deck. The disc drive PCB houses communication and control electronics for the disc drive.

The flex cable assembly includes a flex cable comprising a flexible, ribbon-like laminated member which electrically isolates and supports a number of embedded electrical conduction paths (conductors) along the length of the member.

A proximal end of the flex cable is supported by a flex cable support (flex cable clamp) mounted to the base deck, and a distal end of the flex cable is attached to the HSA. Typically, a bulkhead connector extends through the base deck to facilitate electrical connection from the flex cable support to the disc drive PCB.

The intermediary portion of the flex cable between the flex cable support and the HSA is sometimes referred to as a "dynamic loop." The dynamic loop provides sufficient slack (strain relief) to allow the HSA to move the heads across the full radius of each disc surface.

As will be recognized, the flex cable acts as a spring and will thus provide undesired bias forces upon the HSA as the heads are moved to different positions with respect to the disc surfaces. Such bias forces tend to nominally urge the heads away from the desired position over a selected track and therefore must be within a range that can be compensated by servo control circuitry of the drive in order for the drive to operate in a reliable manner.

Disc drive designers attempt to provide flex cable assembly configurations with controllable and repeatable flex cable dynamic loop characteristics over the desired range of HSA motion. Designers further attempt to provide flex cable assembly configurations that are simple and easily installed in automated assembly processes.

With continued market driven requirements of producing higher data storage capacity drives at successively lower costs, there is a continued need in the art for improved flex cable assembly configurations. It is to such improvements that the claimed invention is directed.

SUMMARY OF THE INVENTION

In accordance with preferred embodiments, a flex cable assembly is provided for use in a disc drive having a rotatable disc with a data storage surface and a head stack assembly which moves a data transducing head across the surface.

The flex cable assembly includes a flex cable comprising a flexible, laminated ribbon-like member with an embedded conductor to pass electrical signals between the head stack assembly and a disc drive printed circuit board.

The flex cable assembly further includes a flex cable support which supports a proximal end of the flex cable. The flex cable support comprises a base and adjacent first and second flex support portions with respective first and second flex support surfaces.

The flex cable is routed along the flex support surfaces and exerts a spring force thereagainst as the flex cable attempts to return to a nominally planar orientation. This spring force tends to retain the flex cable against the support surfaces. The direction of the second flex support surface establishes the orientation of a dynamic loop between the flex cable support and the head stack assembly.

Preferably, a portion of the flex cable pulls away from the second flex support surface to lengthen the dynamic loop in response to movement of the head stack assembly. Retention tabs preferably resist lateral displacement of the flex cable with respect to the support surfaces.

The first support portion preferably extends in a direction substantially normal to the second support portion, and a gap is preferably formed between the first and second support portions to facilitate installation of the flex cable onto the flex cable support.

These and various other features and advantages which characterize the claimed invention will become apparent upon reading the following detailed description and upon reviewing the associated drawings.

BRIEF DESCRIPTION OF THE DRAWINGS

FIG. 2 is a top perspective view of a flex cable support of the disc drive of FIG. 1.

FIG. 3 is a different top perspective view of the flex cable support of FIGS. 1 and 2.

FIG. 4 is a bottom perspective view of the flex cable support of FIGS. 1–3.

FIG. 5 is a side view of a flex cable supported by the flex cable support.

FIG. 6 is a schematic view of the flex cable support to illustrate a preferred manner in which a portion of the flex circuit pulls away to length the dynamic loop as the head stack assembly of the disc drive moves across the surfaces of the discs.

FIGS. 7–9 illustrate a preferred methodology to install the flex circuit onto the flex cable support.

FIG. 10 shows another flex cable support configuration in accordance with a preferred embodiment.

FIG. 11 shows yet another flex cable support configuration in accordance with a preferred embodiment.

DETAILED DESCRIPTION

Figure 1:
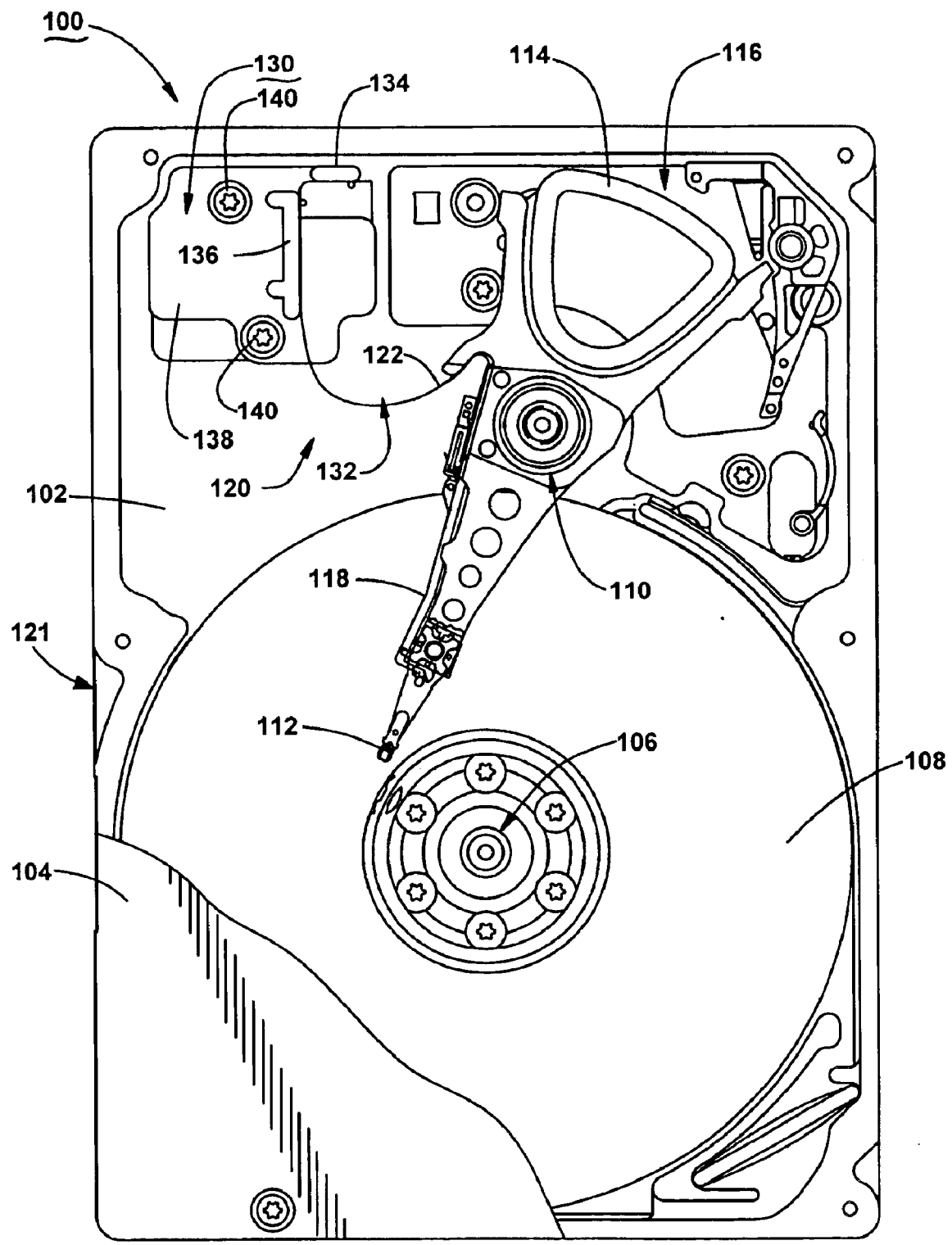
FIG. 1 is a plan view of a disc drive constructed in accordance with preferred embodiments of the present invention.

FIG. 1 provides a top plan view of a disc drive 100 constructed in accordance with preferred embodiments of the present invention. A base deck 102 and a top cover 104 (shown in partial cutaway) cooperate to form a sealed housing for the disc drive 100.

A spindle motor 106 rotates a number of magnetic recording discs 108 at a constant, high speed. A rotary actuator assembly 110 (head stack assembly, HSA) supports a number of data transducing heads 112 adjacent the disc surfaces.

The heads 112 are moved across the discs 108 through application of current to a coil 114 of a voice coil motor (VCM) 116. Flex on suspension (FOS) conductors 118 are routed from the heads 112 along the HSA 110 to accommodate data write and read signals to and from the heads 112.

A flex cable assembly (generally denoted at 120) facilitates electrical communication between the HSA 110 and a disc drive printed circuit board (PCB) 121 mounted to the underside of the base deck 102. The PCB 121 is not fully visible in the drawings, but will be understood to take a conventional configuration and house the requisite communication and control electronics for the disc drive 100.

The flex cable assembly 120 includes a flex cable 122 comprising a flexible, ribbon-like laminated member which electrically isolates and supports a number of embedded electrical conduction paths (conductors) along the length of the member. A proximal end of the flex cable 122 is supported by a flex cable support 130 (also referred to as a "flex cable clamp"). A distal end of the flex cable 122 is affixed to a side of the HSA 110.

The distal end of the flex cable 122 electrically connects to the EQS conductors 118 and to the coil 114, and further preferably supports preamplifier/ driver circuitry (not separately designated) used during read and write operations. A bulkhead connector or similar (not shown) extends under the flex cable support 130 and through the base deck 102 to facilitate electrical connection with the disc drive PCB 121 in a conventional manner.

A flex cable dynamic loop 132 comprises the intermediary portion of the flex cable between the flex cable support 130 and the HSA 110. The dynamic loop 132 allows the HSA 110 to move the heads 112 across the full radii of the discs 108. As discussed below, the flex cable support 130 advantageously provides the dynamic loop 132 with selectively controlled characteristics to improve HSA operation.

FIGS. 2–4 show various views of the flex cable support 130, and FIG. 5 shows a preferred configuration of the proximal end of the flex cable 122. The flex cable support 130 includes first and second support portions 134, 136 which project from a base portion 138 as shown.

Fasteners 140 (shown in FIG. 1) extend through fastener apertures 142 (FIGS. 2–4) to secure the base portion 138 to the base deck 102. Alignment tabs 144 extend into corresponding base deck apertures (not shown) to ensure proper alignment of the base portion 138.

The first support portion 134 includes a first flex support surface 146 (best viewed in FIG. 2) against which the flex cable 122 pressingly abuts, as shown in FIG. 1. A first retention tab 148 extends from the first flex support surface 146 and passes through a first tab aperture 150 in the flex cable 122 (FIG. 5).

Similarly, the second support portion 136 includes a second flex support surface 152 (best viewed in FIG. 2) against which the flex cable 122 pressingly abuts. A second retention tab 154 extends from the second flex support surface 152 and passes through a second tab aperture 156 in the flex cable 122.

A connector contact portion 158 at the proximal end of the flex cable 122 is routed down and under the base portion 138 and is preferably adhered to the base portion using an adhesive pad 160.

Since the flex cable 122 tends to act as a spring and has a propensity to resist deflection away from a substantially planar orientation, the flex cable 122 will naturally exert a spring force against the first and second support surfaces 146, 152, thereby retaining the flex cable against said surfaces. The retention tabs 148, 154 further prevent lateral sliding of the flex cable 122 with respect to the surfaces 146, 152.

The second flex support surface 152 preferably establishes the direction of the end of the dynamic loop 132 opposite the HSA 110; that is, the flex cable 122 follows the shape of the second flex support surface 152 and then smoothly transitions into a substantially parabolic shape without discontinuity or change in direction.

Depending upon the configuration, movement of the heads 112 toward the outer diameters of the discs 108 will preferably cause a portion of the flex cable 122 to pull away from the end of the second flex support surface 152, thereby lengthening the dynamic loop 132 slightly while maintaining this continuity of transition. This is illustrated by FIG. 6.

These factors contribute to the flex cable support 130 providing improved and more consistent dynamic loop characteristics across the width of the discs 108 as compared to prior art configurations.

The first and second support portions 134, 136 are preferably formed as separate members so that a gap 162 (FIG. 2) is formed therebetween. The gap 162 advantageously allows the flex cable 122 to be mated with the flex cable support 130 in a fast and efficient manner.

As illustrated by FIGS. 7–9, once the connector contact portion 158 is adhered to the adhesive pad 160, the flex cable 122 is oriented so that first alignment tab aperture 150 of the flex cable 122 is placed about the first retention tab 148. The remaining length of the flex cable is passed through the gap 162 (see FIG. 7).

Next, the flex cable 122 is doubled back (without crimping) to form a loop 164 and the flex cable 122 is passed back through the gap 162 (FIG. 8). The flex cable 122 is then advanced to align the second alignment tab aperture 156 in the flex cable 122 with the second retention tab 154 to provide the flex cable with the final desired orientation with respect to the flex cable support 130 (as shown in FIG. 9). The routing of the flex cable 122 with respect to the first and second support surfaces 146, 152 can take place either before or after the base 138 is affixed to the base deck 102.

Although the flex cable support 130 provides the first and second flex support surfaces 146, 152 at substantially 90 degrees, other configurations are readily envisioned. For example, FIG. 10 illustrates a flex cable support 170 generally similar to the flex cable support 130, but with first and second flex support portions 172, 174 that are oriented to have respectively parallel flex support surfaces. As before, the flex cable 122 will tend to exert a spring force against the first and second flex support portions 172, 174, and retention tabs 176, 178 will prevent lateral displacement of the flex cable 122.

Although the flex cable supports 130, 170 provide substantially planar (linear) flex support surfaces, such are not necessarily required. FIG. 11 illustrates a flex cable support 180 generally similar to the flex cable supports 130, 170, but with first and second flex support portions 182, 184 that extend in respective curvilinear directions. As before, the flex cable 122 exerts a spring force against the portions 182, 184, and retention tabs 186, 188 restrict lateral displacement of the flex cable 122.

Accordingly, it will be recognized that the present invention is generally directed to a flex cable assembly having improved flex cable dynamic loop characteristics. In accordance with preferred embodiments, a disc drive data storage device (such as 100) comprises a rotatable disc (such as 108) having a data storage surface, a head stack assembly (such as 110) which controllably moves a data transducing head (such as 112) adjacent the data storage surface, and a flex cable assembly (such as 120).

The flex cable assembly comprises a flex cable (such as 122) comprising a laminated, flexible, ribbon-like member with at least one embedded electrical conductor used to transmit electrical signals to the head stack assembly, the flex cable having a nominally planar orientation, a proximal end and a distal end.

The flex cable assembly further comprises a flex cable support (such as 130, 170, 180) comprising a base (such as 138) and adjacent first and second flex support portions (such as 134 and 136, 172 and 174, and 182 and 184) extending from the base, the first flex support portion comprising a first flex support surface (such as 146) extending along a first direction, the second flex support portion comprising a second flex support surface (such as 152) extending along a different, second direction, and wherein the proximal end of the flex cable pressingly abuts and exerts a spring force against the first and second flex support surfaces to retain the flex cable against said support surfaces, said spring force generated as the flex cable attempts to return to the nominally planar orientation.

The flex cable further comprises a dynamic loop (such as 132) between the proximal and distal ends to provide strain relief for the flex cable as the head stack assembly moves the head across the data storage surface, and wherein an end of the dynamic loop adjacent the flex cable support substantially extends in the second direction of the second flex support surface.

Preferably, the dynamic loop has a nominal length along the length of the flex cable when the head is located at a first position with respect to the data storage surface, and wherein a portion of the flex cable is pulled away from the second flex support surface as the head is moved to a second position with respect to the data storage surface so that the dynamic loop achieves a second length longer than the nominal length (such as illustrated in FIG. 6).

Preferably, at least a selected one of the first and second flex support portions further comprises a retention tab (such as 148, 154, 176, 178, 186, 188) which extends through a corresponding tab aperture (such as 150, 156) in the flex cable to restrict lateral movement of the flex cable.

For purposes of the appended claims, the recited first means will be understood as corresponding to the disclosed flex cable supports 130, 170 and 180.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the flex cable assembly without departing from the spirit and scope of the present invention.

In addition, although the embodiments described herein are directed to a flex cable assembly for a disc drive, it will be appreciated by those skilled in the art that the flex cable assembly can be used for other devices and applications without departing from the spirit and scope of the claimed invention.

What is claimed is:

1. A flex cable assembly, comprising:
    a flex cable comprising a flexible member with a nominally planar orientation; and
    a flex cable support comprising a base and adjacent first and second flex support portions extending from the base, wherein the first flex support portion comprises a first flex support surface extending along a first direction and providing a first retention tab, wherein the second flex support portion comprises a second flex support surface extending along a second direction and providing a second retention tab, wherein the flex cable pressingly abuts and exerts a spring force against the first and second flex support surfaces to retain the flex cable against said support surfaces, said spring force generated as the flex cable attempts to return to the nominally planar orientation, and wherein each retention tab extends through a corresponding tab aperture in the flex cable to restrict lateral movement of the flex cable.

2. The flex cable assembly of claim 1, wherein the first and second directions intersect to form an angle of less than 180 degrees.

3. The flex cable assembly of claim 1, wherein the first and second directions intersect to form an angle of substantially 90 degrees.

4. The flex cable assembly of claim 1, wherein the first and second directions are substantially parallel.

5. The flex cable assembly of claim 1, wherein a gap is formed between the first and second flex support portions to facilitate routing of the flex cable along the respective first and second flex support surfaces.

6. The flex cable assembly of claim 1, wherein the flex cable assembly is used to conduct electrical signals to a moveable head stack assembly of a disc drive data storage device, wherein the flex cable comprises a proximal end affixed to the flex cable support and a distal end affixed to the head stack assembly.

7. The flex cable assembly of claim 1, wherein at least a selected one of the first and second flex support surfaces is substantially planar.

8. The flex cable assembly of claim 1, wherein at least a selected one of the first and second flex support surfaces is curvilinear.

9. A disc drive data storage device, comprising:
    a rotatable disc having a data storage surface;
    a head stack assembly which controllably moves a data transducing head adjacent the data storage surface; and
    a flex cable assembly comprising:
        a flex cable comprising a flexible member with at least one embedded electrical conductor used to transmit electrical signals to the head stack assembly, the flex cable having a nominally planar orientation, a proximal end and a distal end, said distal end affixed to the head stack assembly; and a flex cable support comprising a base and adjacent first and second flex support portions extending from the base, the first flex support portion comprising a first flex support surface extending along a first direction, the second flex support portion comprising a second flex support surface extending along a second direction, and wherein the proximal end of the flex cable pressingly abuts and exerts a spring force against the first and second flex support surfaces to retain the flex cable against said support surfaces, said spring force generated as the flex cable attempts to return to the nominally planar orientation, and further wherein each of the first and second flex support portions further comprises a retention tab for extension through a corresponding tab aperture in the flex cable to restrict lateral movement of the flex cable.

10. The disc drive data storage device of claim 9, wherein the flex cable further comprises a dynamic loop between the proximal and distal ends to provide strain relief for the flex cable as the head stack assembly moves the head across the data storage surface, and wherein an end of the dynamic loop adjacent the flex cable support substantially extends in the second direction of the second flex support surface.

11. The disc drive data storage device of claim 10, wherein the dynamic loop has a nominal length along the length of the flex cable when the head is located at a first position with respect to the data storage surface, and wherein a portion of the flex cable is pulled away from the second flex support surface as the head is moved to a second position with respect to the data storage surface so that the dynamic loop achieves a second length longer than the nominal length.

12. The disc drive data storage device of claim 9, wherein at least a selected one of the first and second flex support surfaces is substantially planar.

13. The disc drive data storage device of claim 9, wherein at least a selected one of the first and second flex support surfaces is curvilinear.

14. The disc drive data storage device of claim 9, further comprising a rigid base deck, wherein the base of the flex cable support is affixed to the base deck.

15. The disc drive data storage device of claim 9, wherein the disc drive data storage device further comprises a printed circuit board affixed to an exterior surface of a base deck, and wherein the flex cable facilitates electrical communication between the head stack assembly and the printed circuit board.

16. A disc drive data storage device, comprising:

a rotatable disc having a data storage surface;

a head stack assembly which controllably moves a data transducing head adjacent the data storage surface; and a flex cable assembly comprising:

a flex cable comprising a laminated, flexible, ribbon-like member with at least one embedded electrical conductor used to transmit electrical signals to the head stack assembly, the flex cable having a nominally planar orientation, a proximal end, a distal end, and a dynamic loop between said proximal and distal ends, wherein the distal end is affixed to the head stack assembly and wherein the dynamic loop has a nominal length when the head is located at a first position adjacent the data storage surface; and first means for supporting the proximal end of the flex cable and for facilitating extension of the length of the dynamic loop to a second length greater than the nominal length when the head is located at a second position adjacent the data storage surface.

17. The disc drive data storage device of claim 16, wherein the first means comprises a flex cable support comprising a base and adjacent first and second flex support portions extending from the base, the first flex support portion comprising a first flex support surface extending along a first direction, the second flex support portion comprising a second flex support surface extending along a different, second direction, and wherein the proximal end of the flex cable pressingly abuts and exerts a spring force against the first and second flex support surfaces to retain the flex cable against said support surfaces, said spring force generated as the flex cable attempts to return to the nominally planar orientation, and further wherein each the first and second flex support portions further comprises a retention tab for extending through a corresponding tab aperture in the flex cable to restrict lateral movement of the flex cable relative to each respective first and second flex support surface.

* * * * *

UNITED STATES PATENT AND TRADEMARK OFFICE
CERTIFICATE OF CORRECTION

PATENT NO. : 6,856,490 B2
DATED : February 15, 2005
INVENTOR(S) : Wolfgang Rosner et al.

It is certified that error appears in the above-identified patent and that said Letters Patent is hereby corrected as shown below:

Column 3,
Line 37, replace "EQS" with -- FOS --.

Column 7,
Line 10, replace "direction, and wherein" with -- direction, wherein --.

Signed and Sealed this

Twenty-third Day of August, 2005

JON W. DUDAS
*Director of the United States Patent and Trademark Office*